United States Patent [19]

Hamid et al.

[11] Patent Number: 5,241,681
[45] Date of Patent: Aug. 31, 1993

[54] COMPUTER SYSTEM HAVING AN INTERNAL CACH MICROPROCESSOR SLOWDOWN CIRCUIT PROVIDING AN EXTERNAL ADDRESS SIGNAL

[75] Inventors: Mustafa A. Hamid; Roy E. Thoma, III; John S. Thayer, all of Houston, Tex.

[73] Assignee: Compaq Computer Corporation, Houston, Tex.

[21] Appl. No.: 431,648

[22] Filed: Nov. 3, 1989

[51] Int. Cl.⁵ .............. G06F 9/302; G06F 12/08; G06F 12/04; G06F 12/02
[52] U.S. Cl. .............................. 395/800; 364/229.5; 364/245.5; 364/246.91; 364/247.3; 364/251.7; 364/254.9; 364/255.1; 364/255.8; 364/242.31; 364/242.3; 364/242.34; 364/242.91; 364/243.41; 364/243.45; 364/243.4; 364/243.3; 364/DIG. 1; 364/DIG. 2
[58] Field of Search ............... 395/325, 375, 275, 800, 395/425, 500, 600, 725, 400, 775

[56] References Cited

U.S. PATENT DOCUMENTS

| 4,426,822 | 1/1984 | Riffe et al. | 395/425 |
|---|---|---|---|
| 4,727,491 | 2/1988 | Culley | 395/500 |
| 4,833,601 | 5/1989 | Barlow et al. | 395/425 |
| 5,041,962 | 8/1991 | Lunsford | 395/325 |
| 5,058,051 | 10/1991 | Brooks | 395/425 |

FOREIGN PATENT DOCUMENTS

| 0260568 | 3/1988 | European Pat. Off. |
|---|---|---|
| WO86/00440 | 1/1986 | World Int. Prop. O. |

OTHER PUBLICATIONS

Compaq Computer Corp., Compaq Deskpro 386/20 Technical Reference Guide, vol. 1, Oct., 1987, pp. 2-8 to 2-10.
Compaq Computer Corp., Compaq Deskpro 386 Technical Reference Guide, vol. 1, May, 1987, pp. 4-18 to 4-20.
Compaq Computer Corp., Compaq Deskpro 386/25 Technical Reference Guide, vol. 1, Aug., 1988, pp. 2-7 to 2-10.
Compaq Computer Corp., Compaq Deskpro 386s Technical Reference Guide, vol. 1, Aug., 1988, pp. 3-8 to 3-10.
Intel Corp., Peripherals, 1990, pp. 1-207 to 1-290.
Intel Corp., i486 Microprocessor, Apr., 1989, pp. 79 to 90.
Proceedings "1989 IEEE International Conference on Computer Design: VLSI in Computers & Processors", Oct. 2-4, 1989, pp. 192-198.

Primary Examiner—Thomas C. Lee
Assistant Examiner—Daniel H. Pan
Attorney, Agent, or Firm—Pravel, Hewitt, Kimball & Krieger

[57] ABSTRACT

A method for slowing down a high speed microprocessor with an internal cache to maintain compatibility with applications software written for slower speed microprocessors. The internal cache of the processor is invalidated during the slowdown and the cache address comparison circuitry is directed to evaluate external addresses for a preset interval, preventing the processor from accessing the cache, thereby slowing down the processor. The external address evaluation direction is released when a bus requesting device indicates a bus request during the slowdown, allowing the processor to respond to the bus request promptly to prevent possible latency problems from occurring, but still maintaining the processor in a halted state.

3 Claims, 2 Drawing Sheets

COMPUTER SYSTEM HAVING AN INTERNAL CACH MICROPROCESSOR SLOWDOWN CIRCUIT PROVIDING AN EXTERNAL ADDRESS SIGNAL

BACKGROUND OF THE INVENTION

1. Field of the Invention

The present invention relates to high-speed microprocessors in personal computer systems, and more particularly to techniques for controlling the speed of a high-speed microprocessor with an internal cache to achieve software compatibility with existing application programs, which, because of their specific hardware dependency, cannot be run at a higher speed.

2. Description of Prior Art

The personal computer industry is a vibrant and growing field that continues to evolve as new innovations occur. The driving force behind this innovation has been the increasing demand for faster and more powerful personal computers. Another major factor in the success of the personal computer industry has been the concern on the part of system designers to maintain compatibility between the newer systems that are being developed and the older systems that are currently on the market or in use.

The introduction of the personal computer has resulted in a tremendous amount of applications programs written for both the professional and the home entertainment markets. These personal computers are designed around commercially available microprocessor chip sets which may include a plurality of microprocessors connected in an architecture which results in varying degrees of execution rates.

A microprocessor chip set widely used by personal computer manufacturers is the Intel Corporation 8086 family of microprocessors. This family includes: the 8088 microprocessor; the 8086 microprocessor; the 80286 microprocessor; the 80386 microprocessor; and now the 80486 microprocessor—all having similar instruction sets. The 80486 is the latest generation of the Intel 8086 family of microprocessors and it has a higher execution cycle rate than its predecessors, almost twice as fast as the 80386 in certain operations. A new feature introduced in the 80486 microprocessor is an 8 kbyte internal cache that it may access without requesting the local bus.

With the availability of a software compatible microprocessor (i.e., executes the same instruction sets), it is possible to upgrade a prior art personal computer to a personal computer with a higher execution speed and maintain compatibility with most application programs written for the lower speed microprocessor chip sets. While faster, software compatible microprocessors are available, it is not possible, however, to simply substitute the faster microprocessor for the slower microprocessor in some cases and thereby produce a personal computer which executes at a higher speed for all of the application programs written for the slower microprocessor.

Not all application programs written for slower microprocessors are capable of running at faster microprocessor speeds even though each instruction in the program is executed in a logically similar manner in these machines. The inability to run some programs at higher speeds results from the fact that programmers, when writing application programs for the slower microprocessors, took advantage of the particular execution cycle time of the microprocessor in structuring routines which were time dependent. Running a program that is dependent on a particular execution speed at higher instruction execution speeds changes the resulting time intervals and thereby renders the program non-functional.

It has also been discovered that many of the currently used copy-protected schemes currently employed by many software writers are dependent on microprocessor clock rates. Many of the new personal computers employing some of the later generation microprocessors with high clock rates cannot utilize the copy-protected software without data transfer errors because these copy-protected programs do not function properly whenever the instruction execution speeds change.

At first blush, changing the frequency of the clock signal applied to the microprocessor would appear to resolve the problem. For example, it is possible to provide a personal computer having an Intel 80486 microprocessor or other high speed microprocessor rather than a slower microprocessor and run the high speed microprocessor at different clocking frequencies: high speeds for those application programs which can run at the higher speeds and slower speeds for those application programs which are time dependent. Unfortunately, this simple clocking speed change does not result in a personal computer which is software compatible for all varieties of application programs.

A change of the clock rate will not suffice to make many of the older software compatible because of the many other machine functions which may be affected. Even though the previous microprocessor chip sets, (i.e. 8086, 8088, 80286, 80386, and 80486) are software compatible, the internal design of the microprocessors is not the same.

One internal design difference between these microprocessors is the amount of prefetch buffer memory provided in the microprocessor as well as the rate at which bytes are fetched from memory. In the Intel 8088 there are four bytes of prefetch queue, in the 8086 there are six bytes of prefetch queue, in the 80286 there are eight bytes of prefetch queue, in the 80386 there are 16 bytes of prefetch queue, and in the 80486 there are 32 bytes of prefetch queue. Each microprocessor is designed to keep its prefetch queue full of information in order that the microprocessor can continue to execute code, which on the average, achieves a desired execution throughput rate. When program jumps occur, the contents of the prefetch buffer are lost. This loss of information is reflected in wasted execution time because of the time required to obtain the prefetch information that is discarded at the time the program jump occurs. The time required to obtain the prefetch information is dependent on the rate at which data is fetched from memory, which varies among the various processors in the Intel family. It is because of this difference in the prefetch buffer capacity and the rate at which data is fetched from memory that a high speed microprocessor runs at a different speed for the same application program when the microprocessor is run at the same clocking frequency as is normally used for a slower microprocessor.

This difference in internal design, coupled with the particular design of the application program, i.e., does it contain a lot of program jumps, affects the execution speed of a given application program. Therefore, the execution time at the high speed for the high speed microprocessor is not necessarily proportionally faster than the execution time when the microprocessor clock rate is set to the slower normal frequency for the slow speed microprocessor. Stated differently, reducing the microprocessor clock rate of a high speed microprocessor while keeping all else the same does not result in the same execution time for a given application program to run on the high speed microprocessor as occurs if the same program is run on the slow speed microprocessor.

Therefore, it would be advantageous to provide a personal computer which provides for a high speed microprocessor to execute application programs which are not time dependent at high speeds, but provides a lower speed execution for those application programs which are time dependent so that the time dependent application programs appear to be running at substantially the same execution speed as they would have run on the microprocessor for which they were written.

Computer designers have used various methods to overcome the software compatibility problems that result from running execution cycle-time dependent software on higher speed microprocessors. Many IBM-compatible computers include logic that generates a slowdown signal which is asserted when the processor is to be slowed down for software compatibility reasons. The slowdown signal is used in conjunction with a means for halting the operation of the high speed microprocessor during the time that the slowdown signal is asserted so that it may more closely conform to the speed of the slower speed microprocessor. One such means includes placing the microprocessor in a hold state and controlling the length of the hold state of the processor to achieve the desired result. While a microprocessor is placed in a hold state, it is prevented from accessing the local bus during that time and is therefore slowed down.

This method has generally proved satisfactory. However, the 80486 microprocessor can continue operation when it is placed in an external hold state because it may still draw instructions and data from its internal cache. Therefore, a new method is necessary to slow down the 80486 microprocessor in order to prevent it from accessing its internal cache during a slowdown and to insure that the central processing unit is actually halted.

Another important consideration is that the processor be able to respond to hold requests during a slowdown to allow requesting bus masters as well as other bus requesting devices access to the bus and thereby prevent possible latency problems from developing. For example, if a device required the bus, the system arbiter would assert a processor hold request PHOLD to the processor. The processor must respond with a processor hold acknowledge signal PHLDA in order for the arbiter to be able to grant control of the bus to the device to prevent any possible latency problems from developing. If the processor does not respond with the HLDA signal within a given time, the time may exceed allowable limits and data may be lost, for example, by the floppy disk controller.

SUMMARY OF THE INVENTION

The present invention includes a method for slowing down a microprocessor with an internal cache while still allowing other bus requesting devices access to the bus during the slowdown. When a slowdown is desired the internal cache of the processor is flushed to immediately halt the processor and thereafter insure that all further memory access will be external addresses. An external address strobe signal EADS* is then asserted, signaling the processor that a valid external address has been driven onto its address pins and forcing the processor to perform an internal cache invalidation cycle. While the EADS* signal remains asserted, the microprocessor is prevented from doing any useful work because it cannot access its internal cache, and thus the processor is slowed down.

The processor still honors a processor hold request PHOLD from the system arbiter. A PHOLD request removes the processor from a slowdown and allows it to assert its hold acknowledge signal PHLDA back to the system arbiter, thereby allowing a requesting device to gain control of the bus. This prevents possible system latency problems that could occur if a device were unable to gain control of the bus during a slowdown. Since the internal cache of the processor was flushed at the beginning of the slowdown, the processor still cannot do any work while it is in a PHOLD state because its internal cache is empty and it must regain control of the bus before it can refill it. When the slowdown is complete, the processor must refill its internal cache before it can resume normal operation, and this operates as a further slowing down mechanism.

BRIEF DESCRIPTION OF THE DRAWINGS

A better understanding of the present invention can be obtained when the following detailed description of the preferred embodiment is considered in conjunction with the following drawings, in which.

DESCRIPTION OF THE PREFERRED EMBODIMENT

Figure 1:
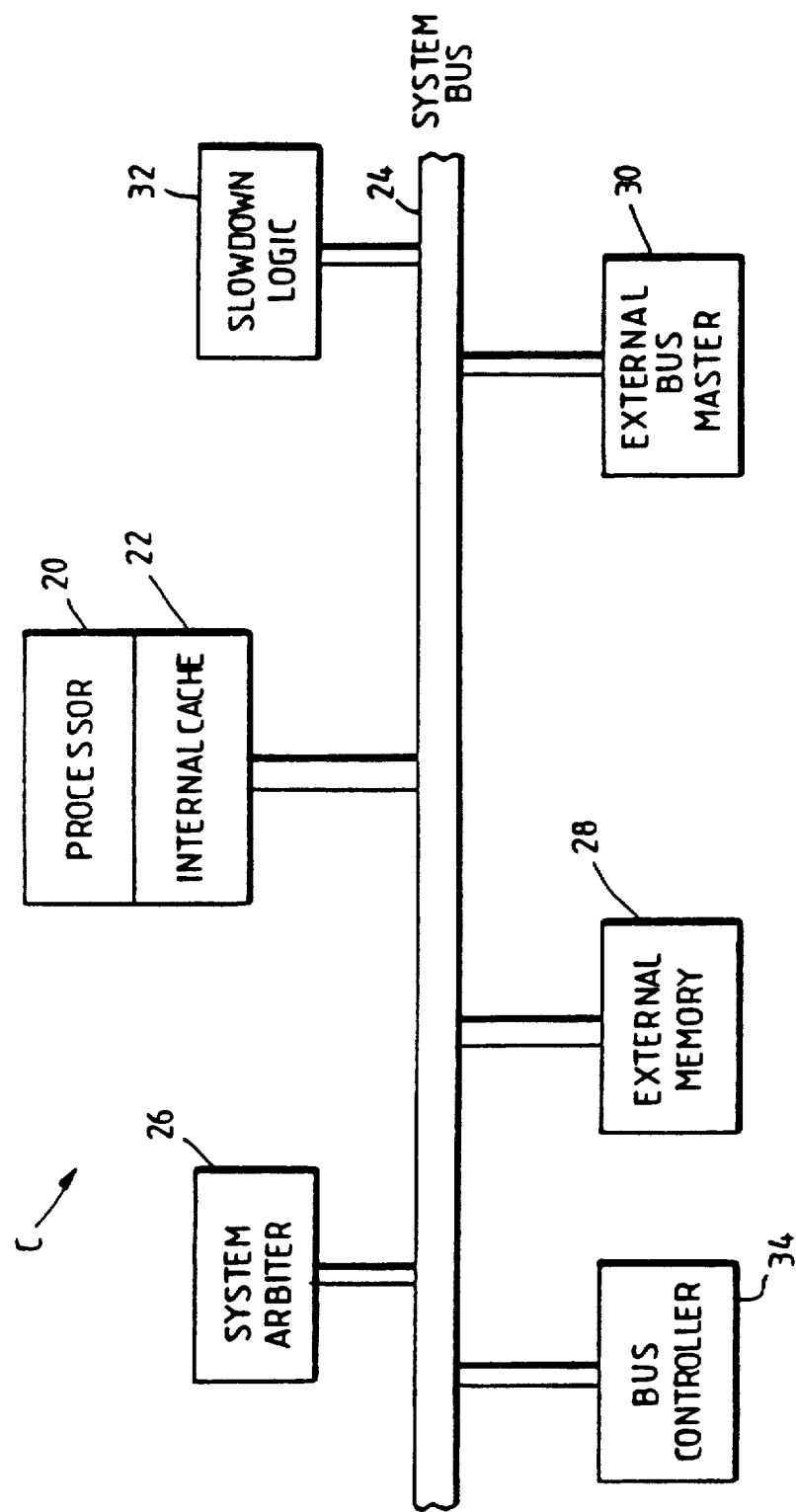
FIG. 1 is a block diagram of a computer system incorporating the present invention.

Referring now to FIG. 1, a computer system C is generally depicted. Many of the details of a computer system that are not relevant to the present invention have been omitted for the purpose of clarity. The computer system C includes a processor 20 with an internal cache memory 22 which is interfaced to a system bus 24. Preferably this processor 20 is the Intel 80486 or i486. Details are available on this processor in the i486 microprocessor data book from Intel. Also interfaced to the system bus 24 is external memory 28, a bus controller 34, an external bus master 30, and a system arbiter 26 that arbitrates among the various bus requests for control of the system bus 24. A block circuit 32 containing slowdown logic according to the present invention is connected to the system bus 24.

Figure 2:
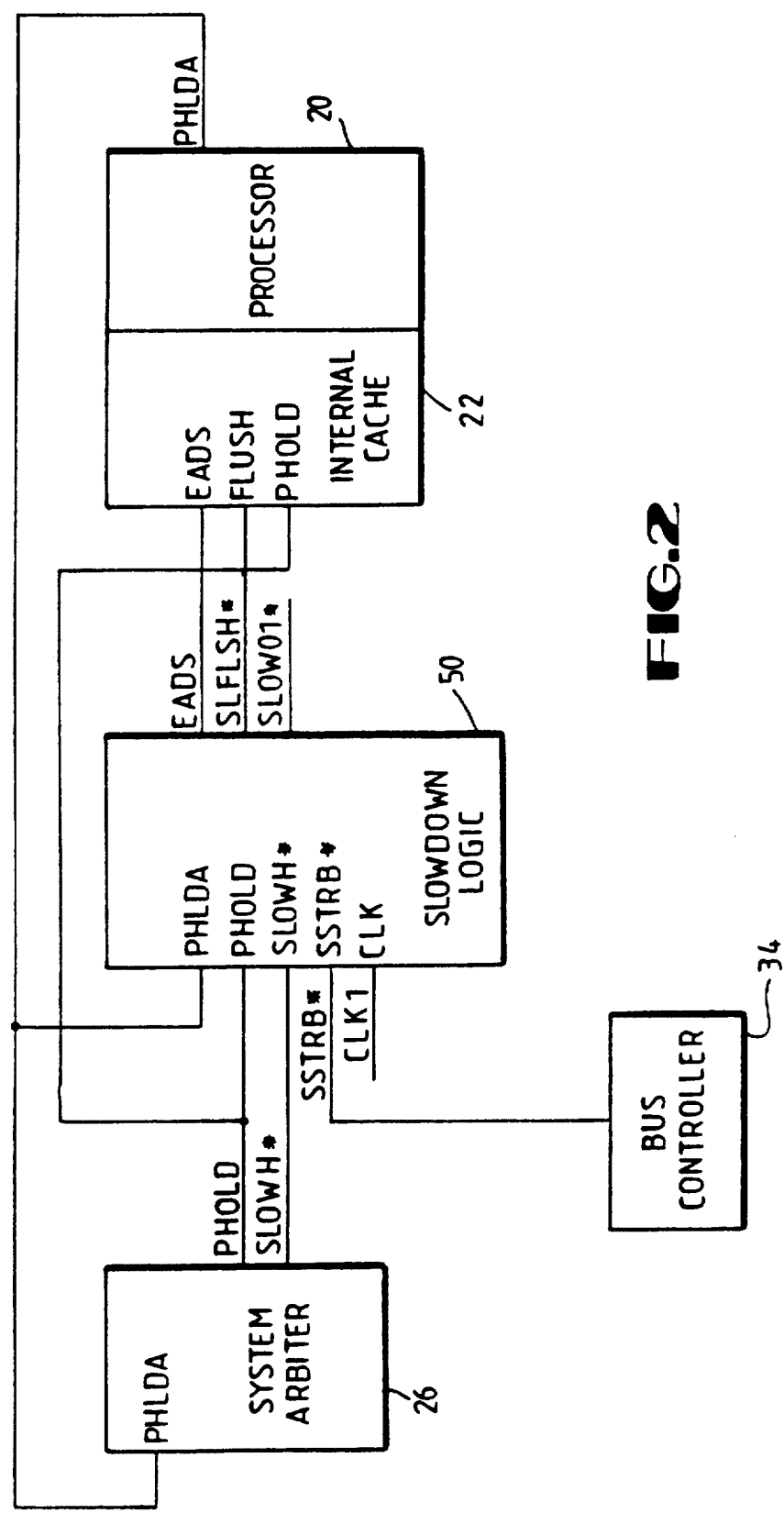
FIG. 2 is a more detailed block diagram of the slowdown logic of FIG. 1 interfaced to the computer system according to the present invention.

Referring now to FIG. 2, the slowdown logic 32 includes a programmable array logic PAL device 50 which includes a number of flip-flops and receives certain control signal inputs to generate control signals that are provided to the internal cache 22 of the processor 20 which halt the operation of the processor 20 but still allow hold requests from the system arbiter 26 to be acknowledged. The signals that are input to the PAL 50 from the system arbiter 26 are the processor hold request signal PHOLD and a slowdown signal referred to as SLOWH*. The PHOLD signal output from the system arbiter 26 is also connected to the PHOLD input of the processor 20. The PHOLD signal is a hold request from the system arbiter 26 to the processor 20 when a device requests control of the bus. The SLOWH* signal is asserted when a slowdown of the processor is necessary to maintain software compatibility with hardware-dependent application programs written for slower speed processors. The SLOWH* signal is preferably developed by a timer located in the system arbiter 26. The timer is triggered each time a refresh cycle is performed. The SLOWH* signal is then active until the programmed time has elapsed. By setting the refresh interval and the length of the SLOWH* timer, the processor 20 can be slowed sufficiently to simulate the slower microprocessors. Particular values depend on the system refresh rate, the processor 20 clock rate, the memory speed, and the processor being emulated.

A processor hold acknowledge signal PHLDA is output from the processor 20 and is an input to the PAL 50 and the system arbiter 26. The PHLDA signal is asserted by the processor 20 when it acknowledges a PHOLD request from the system arbiter 26. A snoop strobe signal SSTRB*, which indicates, when it is asserted, that a device such as the bus master 30 is writing to external memory 28 is output from the bus controller 34 and is input to the PAL 50. The PAL 50 is clocked by the system clock, here referred to as CLK1, which is connected to the clock inputs of the flip-flops contained in the PAL 50.

From these signal inputs, the PAL 50 generates certain signals which affect the slowdown of the processor 20. In the signal equations that follow a signal written by itself is deemed active or asserted when at a high level, and a signal followed by an asterisk is deemed inactive or negated when at a high level. Signals SLOWD1, the equation for which is $$SLOWD1 := SLOWH.$$

The SLOWD1 signal is a version of the SLOWH signal, the inverse of the SLOWH* signal, that is delayed 1 CLK1 signal cycle and is synchronized with the CLK1 signal.

The SLOWD1 signal is used to help generate a flushing signal referred to as SLFLSH*, the equation for which is $$SLFLSH := SLOWH \times SLOWD1^*.$$

The SLFLSH* signal is connected to the FLUSH* input of the internal cache 22. The SLFLSH* signal is pulsed at the start of a slowdown cycle when the SLOWH* signal is asserted, causing the FLUSH* input of the internal cache 22 to be pulsed, which flushes the internal cache 22 and thereby dictates that the processor 20 must regain control of the system bus 24 and refill its cache before it may resume operation. This feature maintains the processor 20 in a halted condition during a hold request because it cannot access the bus to fill its internal cache while it is in a hold state. The SLFLSH* signal also operates to further slow the processor 20 because at the end of the slowdown the processor 20 must refill its internal cache as it resumes operation.

The PAL 50 also generates the external address strobe signal EADS*, the equation for which is $$EADS := (SSTRB \times PHLDA) + (SLOWD1 \times PHOLD^*).$$

The EADS* signal is provided to the EADS* input of the internal cache 22 and it indicates that a valid external address has been driven onto the address pins of the processor 20. The assertion of the EADS* signal forces the internal cache 22 to perform cache invalidation cycles to determine if the external address being written to also resides in the internal cache for cache coherency considerations. The construction of the 80486 is such that either the processor 20 or the external address validation circuitry can access the tag memories containing the cached address information, but both cannot access the tag memories at the same time. Thus when the EADS* signal is asserted, the processor 20 is locked from accessing the tag memories and thus must completely halt operations, entering an idle or wait loop until the tag memories are available.

As demonstrated by the first minterm of the above equation, the EADS* signal is asserted when a device such as the bus master 30 writes to external memory while the processor 20 is in a held state. The second minterm of the above equation provides that the EADS* signal is also asserted during the period that a slowdown is requested from the system arbiter 26, this to prevent the processor 20 from accessing its internal cache 22 during this period and thereby slow down the processor 20.

However, a PHOLD request from the system arbiter 26 negates the EADS* signal, allowing the processor 20 to acknowledge the PHOLD request by asserting the PHLDA signal, thereby enabling the requesting device 30 to gain control of the bus. Were the PHOLD term not included, the processor 20 would not acknowledge the hold request until after the SLOWH* signal was negated. This time might easily exceed allowable latency times. Thus the inclusion of the PHOLD term in the second minterm of the above equation resolves the latency problem. Note also that the processor 20 remains halted during the PHOLD request because its cache 22 was flushed at the beginning of the slowdown.

Therefore, the present invention enables a microprocessor with an internal cache to be slowed down by asserting the EADS* signal during the time that a slowdown is requested to force the internal cache 22 to perform invalidation cycles and thereby prevent the processor 20 from accessing its cache. However, a slowdown can be interrupted by hold requests from the system arbiter 26. In this way, system latencies are prevented because bus requesting devices may obtain control of the bus during a slowdown. The processor 20 remains halted during a hold request because its cache was flushed at the beginning of the slowdown.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A computer with a high speed microprocessor compatible with applications software written for slower speed microprocessors, comprising:
   a system bus;
   a high speed microprocessor that includes an internal cache memory system having an external address strobe input to indicate availability of an address for snooping purposes and for preventing said high speed microprocessor from a accessing said internal cache memory while said external address strobe signal is active, said microprocessor coupled to said system bus and said microprocessor being inactive when said external address strobe input is being provided;

a device coupled to said system bus capable of requesting control of said system bus, said device generating a hold request when said device requests control of said system bus;

means coupled to said system bus for producing a slowdown signal that is asserted when a microprocessor slowdown is required; and means coupled to said system bus for receiving said slowdown signal and a bus request from said bus requesting device, said receiving means, upon receiving said slowdown signal, generating said external address strobe signal that is provided to said internal cache memory system thereby rendering said high speed microprocessor inactive for the purpose of slowing down said high speed microprocessor, said receiving means removing said external address strobe signal to reactivate said high speed microprocessor upon receiving said hold request generated by said device requesting control of said system bus.

2. The computer system of claim 1, wherein said receiving means additionally generates said external address strobe signal when said slowdown is not present, said microprocessor has released control of said system bus and said requesting device is in control of said system bus.

3. The computer system of claim 1, wherein said internal cache memory system includes an input for receiving a flush signal and wherein said receiving means monetarily generates a flush signal which is connected to the flush input of said internal cache memory system, said flush signal being generated before said external address strobe signal.

* * * * *

UNITED STATES PATENT AND TRADEMARK OFFICE
CERTIFICATE OF CORRECTION

PATENT NO. : 5,241,681
DATED : August 31, 1993
INVENTOR(S) : Mustafa A. Hamid, et al.

It is certified that error appears in the above-identified patent and that said Letters Patent is hereby corrected as shown below:

Claim 1, column 6, line 66, please change " a accessing" to --accessing--.

Signed and Sealed this

Twenty-second Day of March, 1994

Attest:

BRUCE LEHMAN

*Attesting Officer*   *Commissioner of Patents and Trademarks*